United States Patent
Brinkmann et al.

(10) Patent No.: US 10,777,793 B2
(45) Date of Patent: Sep. 15, 2020

(54) INSULATING SYSTEM FOR A BATTERY SYSTEM AND METHOD FOR CONTROLLING SUCH AN INSULATING SYSTEM

(71) Applicant: FORD GLOBAL TECHNOLOGIES, LLC, Dearborn, MI (US)

(72) Inventors: Bernd Brinkmann, Dormagen (DE); Thomas Nitsche, Neuss (DE); Julian Tietze, Cologne (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/259,203

(22) Filed: Jan. 28, 2019

(65) Prior Publication Data
US 2019/0245170 A1    Aug. 8, 2019

(30) Foreign Application Priority Data
Feb. 2, 2018  (DE) .......................... 10 2018 201 608

(51) Int. Cl.
*H01M 2/10*  (2006.01)
*H01M 10/653*  (2014.01)
(Continued)

(52) U.S. Cl.
CPC ........... *H01M 2/1083* (2013.01); *B60L 50/64* (2019.02); *B60L 50/66* (2019.02); *H01M 2/0277* (2013.01);
(Continued)

(58) Field of Classification Search
CPC ...................................................... B60L 50/64
See application file for complete search history.

(56) References Cited

U.S. PATENT DOCUMENTS 5,347,816 A * 9/1994 Nelson ................. F17C 13/001
                                                           429/120
5,460,900 A * 10/1995 Rao ..................... H01M 2/0242
                                                           429/120
(Continued)

FOREIGN PATENT DOCUMENTS

CN     102751460 A    10/2012
DE     10319350 B4    12/2008
(Continued)

*Primary Examiner* — Brian L Swenson
(74) *Attorney, Agent, or Firm* — Brooks Kushman PC; David Kelley

(57) ABSTRACT

A vehicle battery insulating system includes an inner wall and outer wall forming an insulating cavity filled with a microporous material such as microporous silica. A vacuum pump is coupled to a first connection of the cavity and a valve is coupled to a second connection of the cavity. A controller operates the vacuum pump and the valve to lower/raise pressure within the cavity to decrease/increase thermal conductivity, respectively, of the insulating layer to influence temperature of a vehicle battery. A battery housing may include inlet and outlet ports coupled to a pump to circulate a heat exchanging fluid. The controller may monitor temperatures from sensors and/or receive wireless information relative to traffic, ambient temperature, weather forecasts, and similar information for use in controlling the insulating system in an attempt to keep the vehicle battery within a desired operating temperature range.

13 Claims, 2 Drawing Sheets

(51) Int. Cl.
*H01M 10/63* (2014.01)
*H01M 10/625* (2014.01)
*H01M 10/613* (2014.01)
*H01M 10/6567* (2014.01)
*B60L 50/64* (2019.01)
*B60L 50/60* (2019.01)
*H01M 2/02* (2006.01)

(52) U.S. Cl.
CPC ....... *H01M 2/1077* (2013.01); *H01M 2/1094* (2013.01); *H01M 10/613* (2015.04); *H01M 10/625* (2015.04); *H01M 10/63* (2015.04); *H01M 10/653* (2015.04); *H01M 10/6567* (2015.04)

(56) References Cited

U.S. PATENT DOCUMENTS

| | | | | |
|---|---|---|---|---|
| 9,537,124 | B2* | 1/2017 | Stanek | H01M 2/1077 |
| 2011/0256432 | A1* | 10/2011 | TenHouten | H01M 2/1072 |
| | | | | 429/50 |
| 2013/0004808 | A1* | 1/2013 | Tschismar | H01M 2/1072 |
| | | | | 429/50 |
| 2014/0216693 | A1* | 8/2014 | Pekarsky | B60H 1/00278 |
| | | | | 165/104.31 |
| 2015/0171493 | A1* | 6/2015 | Freese | H01M 2/1077 |
| | | | | 429/120 |
| 2015/0372356 | A1* | 12/2015 | Kossakovski | H01M 10/6572 |
| | | | | 136/201 |
| 2016/0226115 | A1* | 8/2016 | Wakida | H01M 10/39 |
| 2017/0110770 | A1* | 4/2017 | Marcicki | H01M 10/625 |
| 2017/0288285 | A1* | 10/2017 | Buckhout | H01M 2/1077 |
| 2018/0058769 | A1* | 3/2018 | Bidner | B60H 1/00492 |
| 2019/0140237 | A1* | 5/2019 | Kaye | H01M 2/1094 |

FOREIGN PATENT DOCUMENTS

| | | |
|---|---|---|
| DE | 102012214957 A1 | 2/2014 |
| DE | 102014003413 A1 | 9/2015 |
| DE | 102014111645 A1 | 2/2016 |
| JP | 2011207321 A | 10/2011 |
| WO | 2017029457 A1 | 2/2017 |

* cited by examiner

INSULATING SYSTEM FOR A BATTERY SYSTEM AND METHOD FOR CONTROLLING SUCH AN INSULATING SYSTEM

CROSS-REFERENCE TO RELATED APPLICATIONS

This application claims foreign priority benefits under 35 U.S.C. § 119(a)-(d) to DE Application 10 2018 201 608.9 filed Feb. 2, 2018, which is hereby incorporated by reference in its entirety.

TECHNICAL FIELD

The disclosure relates to a battery system having an insulating system and a battery and a method for controlling the insulating system of a battery.

BACKGROUND

Electric vehicles and hybrid vehicles are known, which have a battery to operate an electric motor, which constitutes the drive motor of the vehicle. The battery has an optimal operating temperature of, for example, about 30° C., at which a high efficiency of the battery exists. It is therefore desirable to keep the current actual temperature of the battery within the range of the optimal desired temperature of the battery. Since during discharging the battery is heated by the removed power and additional thermal influences act on the battery from outside, active and also passive cooling systems are provided in the prior art. The active cooling systems contain a liquid cooling, whereas the passive cooling systems consist of insulating layers.

Thus, DE 10 2012 214 957 A1 teaches panels, i.e., insulating plates which are filled with nanoporous polymer particles. The interior of such panels is additionally under a static vacuum. The taught panels form a passive insulating system. Such insulating plates are available, for example, under the tradename va-Q-vip, wherein the porous filling can contain silica. In DE 10 2012 214 957 A1 it is proposed to arrange the panels in the vehicle directly on the body, for example, on doors, roof, floor area, or rear wall. As a result, any heating of the vehicle interior by external temperatures is reduced, which should have a positive effect on the temperature of the battery. However, it is very disadvantageous that the waste heat of the battery itself is accumulated by the panels in the vehicle interior and thus, in particular on longer journeys, the efficiency of the battery is reduced. Panels having a similar structure and similar disadvantages are disclosed in DE 10 2014 003 413 A1.

An active cooling system for a battery is disclosed in EP 2 744 033 A1. There, a plurality of rows of rod cells are arranged in separate heat exchange pockets. The heat exchange pockets have a cooling liquid flowing through them. Overall the arrangement is coated from outside by an electrically insulating film. A particular disadvantage with this proposal is that only the heat generated by the battery is removed and heat penetrating into the battery from outside is not retained. In addition, the arrangement of separate cooling pockets is cumbersome and expensive.

DE 10 2014 111 645 A1 discloses a battery housing for receiving a battery. In this case, the housing has a double wall, which is filled with a glass fiber material. A vacuum is generated in the double wall thus filled. Furthermore, an active element is arranged in the double wall, which can be heated to produce a hydrogen atmosphere in the double wall and thus reduce the vacuum. In this case, the active element can degrade and the quality of the vacuum can vary. In addition, the interior of the housing is filled with a porous material and cannot be efficiently cooled by a cooling liquid.

CN 102751460 A discloses a high-temperature-resistant composite insulating film. The high-temperature-resistant composite insulating film is formed by a combination of a polyphenylene sulfide film and a microporous polyolefin film. The film is used for the application in lithium ion batteries. However, the film is a passive insulating element, whose insulating properties cannot be varied after manufacture.

WO 2017/029457 A1 discloses a plurality of adjacent modules, which are interconnected by circulating means and which each contain at least one volume, in which a coolant or heat transfer liquid is present. The coolant and the heat transfer liquid can circulate through the volumes to regulate the heat balance of the modules. A layer is arranged on the periphery of at least some of the modules, wherein the layer is thermally insulating. The layer forms a passive insulating element. This proposal is a cumbersome solution which is not adapted for heat input from outside.

SUMMARY

A battery system according to one or more embodiments includes an insulating system for a vehicle that regulates heat gain/loss to control an actual temperature of the battery of the vehicle to a desired temperature while making efficient use of installation space.

It should be pointed out that the features and measures listed individually in the following description can be combined in any technically meaningful manner with one another and indicate further embodiments not specifically illustrated or described but within the scope of the claimed subject matter.

The battery system according to one or more embodiments is provided for a vehicle. In particular, the vehicle is a purely electrically driven vehicle or a hybrid vehicle, which has an electric motor and another drive, e.g. an internal combustion engine. The battery system has an insulating system which covers a battery of the battery system at least on one side and thus thermally decouples the battery at least partially from an environment surrounding the battery system as required. The insulating system contains at least one insulating plate. The insulating plate has a first connection and a second connection, which provide a connection to a cavity arranged in the insulating plate toward the outside. The cavity is enclosed in an airtight sleeve of the insulating plate, wherein the connections are guided through the sleeve. The sleeve can be provided by a thermally stable sleeve. It is proposed to arrange a porous material in the cavity so that the pores of the porous material form the cavity after filling. Specifically, microporous silica may be used as the porous material. In addition, it is proposed to connect a vacuum pump to the first connection, by means of which a vacuum is selectively generated in the cavity filled with the porous material. In so doing, a gas is pumped in particular out of the pores of the porous material, so that a vacuum is generated in the porous material. A vacuum pump provided in the vehicle for other systems can be used as the vacuum pump, so that no additional vacuum pump need be mounted in the vehicle. Alternatively, an additional vacuum pump is also feasible, which is provided separately for the insulating system.

As a result of producing the vacuum combined with the porous material, the insulating system, i.e. the insulating plate, achieves a thermal conductivity of approximately 0.004 W/m·K at a pressure of 10 mbar. As a result, a high thermal decoupling of a battery from the environment is achieved by the insulating system with the insulating plate.

Furthermore, an outlet valve is connected to the second connection, by means of which the vacuum can be reduced and/or removed, whereby the outlet valve is opened and a gas can flow again in the cavity filled with the porous material. At a pressure of 1 bar, the thermal conductivity of the insulating system, i.e. of the insulating plate is approximately 0.02 W/m·K. Due to the increased thermal conductivity, a transfer of thermal energy from the battery into the environment and also in the opposite direction is possible depending on the heat gradient so that waste heat of the battery, and also the thermal influence of the environment on the battery, can be used for an efficient thermal management. Thus, by controlling the pressure inside the cavity filled with the porous material, the battery can be operated in a desired or optimal temperature range for the efficiency of the battery.

Advantageously at least one feed-through can be formed in the insulating plate. A liquid can be guided from one side of the insulating plate to the opposite side of the insulating plate through the feed-through. If liquid is now brought to the insulating plate from one side, this can be guided through the insulating plate by means of the feed-through and brought to the opposite side to the battery for warming or cooling the battery. In this way, the battery temperature can be controlled very efficiently by means of a liquid cooling if, for example, there is a large amount of waste heat or a high heat input from outside. A heat input into the battery can also take place through the liquid if very low ambient temperatures of the environment are present. To this end, merely correspondingly heated liquid is supplied.

An advantageous further development can include the arrangement of a plurality of insulating plates in a housing, which houses the battery. In this case, the battery can be surrounded by the insulating plates. The battery is then at least encircled by the insulating plates so that at least one side remains without insulating plates. Alternatively, the battery is completely enclosed by insulating plates on all sides. This prevents any thermal radiation of the battery or any heat input from outside into the battery from several directions.

In an alternative embodiment, the housing can have pockets, into which the porous material can be poured. The pockets thus form the sleeves of the insulating plates so that the insulating plates are quasi integrated in the housing. The pockets are preferably formed in one piece with the housing. In this case, the pockets can be formed at least in a part of the walls of the housing. They are preferably formed in all the walls of the housing. The pockets are in particular provided by double walls of the housing so that the cavity to be filled is formed. A particularly compact design of the battery system is thereby achieved.

To obtain a battery system which is as powerful as possible, it is advantageous to arrange a plurality of batteries in the housing. The plurality of batteries is arranged between the insulating plates, i.e. in the housing. The batteries are in this case spaced apart from one another. In particular, they are aligned parallel to one another so that channels for the liquid are formed between the batteries. The liquid guided through the insulating plates flows around the batteries between the insulating plates, i.e. in the housing, so that an optimal heat exchange can take place between the liquid and in batteries.

The liquid supplied through the insulating plate is removed again after flowing around the battery and optionally cooled or heated, for which available heat exchangers can be used or additional heat exchangers are mounted. It is expedient if a closed liquid circuit is integrated, wherein the heat exchanger or exchangers are in communication with usage elements in the vehicle such as, for example, air conditioning systems and/or interior heaters. Thus, the temperature amount of the liquid can be used for cooling the vehicle interior or for its heating. If the vehicle has an internal combustion engine, the liquid can be used for its thermal management, such as for example for shortening the cold start phase.

In various embodiments, the insulating system is controlled by a method that regulates the thermal conductivity of the battery surround to control an actual temperature of the battery depending on an ambient temperature of the environment and a desired temperature of the battery. In this case, the desired temperature can lie approximately in a range of 30° C., wherein this said amount can deviate by ±10%. In this way, the actual temperature of the battery can be regulated exceptionally well to the value of the desired temperature by means of the ambient temperature and a heat dissipation of the battery. To this end, by means of a vacuum pump connected to the first connection, in one step a vacuum can be generated in the cavity filled with the porous material, wherein the battery is decoupled from the environment when the ambient temperature differs from the desired temperature at least by a specified temperature difference. The temperature difference is fundamentally dependent on the battery technology. However, the temperature difference is preferably 5 K. There is therefore a range of ±5 K around the desired temperature.

In a further advantageous step, the vacuum of the cavity can be removed and/or reduced through the outlet valve, whereby a gas flow is introduced into the cavity. The gas flow in particular again fills the porous material with gas. This step is carried out when the actual temperature reaches the desired temperature of the battery. In this case, it is at least dependent on the ambient temperature whether the vacuum is completely removed and only the thermal conductivity of the cavity with the porous material remains or whether the vacuum is merely reduced so that a higher thermal conductivity compared with the complete emptying persists. Which thermal conductivity is optimal for obtaining the actual temperature at the level of the desired temperature is dependent on the ambient temperature and the heat dissipation of the battery, which is not least determined by the power withdrawn from the battery. By optimal adjustment of the thermal conductivity by means of the amount of the vacuum, i.e. by means of the pressure difference, a thermal heat equilibrium is established between the environment and the battery.

Advantageously, the vacuum inside the cavity can be removed and/or reduced when the vehicle is in a parking situation, in particular when no power is withdrawn from the battery to drive the vehicle. The parking situation is characterized by a temporary switch-off of the vehicle, in which the driving mode is suspended, wherein the time interval shortly before switching off the vehicle should be added to the parking situation. The steps of the method according to the invention in the parking situation can be carried out shortly before switching off the vehicle, which can be determined by means of detectable factors. Thus, a corresponding steering activity can be detected or the driving speed below a magnitude of 5 km/h can be determined so that an impending parking situation can be concluded. Preferably a withdrawal of power from the battery can be stopped in the parking situation. The removal and/or reduction of the vacuum is made when the ambient temperature is lower than or approximately the same as the actual temperature but the ambient temperature lies within an acceptable temperature range. The acceptable temperature range in this case preferably extends above and below the desired temperature and lies in particular near the desired temperature. In this way, a controlled cooling of the battery can be ensured so that, for example, a reduced cooling power must be provided by the liquid cooling. Such a parking situation is achieved in particular in the evening and at night on hot summer days, on which the entire vehicle has been strongly heated, wherein in the evening and at night the ambient temperatures decrease in a controllable range. In this case, the protecting vacuum insulation can be removed and/or reduced and the heat of the battery/batteries emitted into the surroundings.

The method can be supplemented by a step which is carried out instead of the previous step. In this additional step, in a parking situation a vacuum is produced in the insulating system when the ambient temperature Tex is lower than and/or higher than the actual temperature of the battery but lies outside the acceptable temperature range, i.e. the actual temperature differs particularly substantially from the desired temperature. In this case, the actual temperature is either low in such a manner that it lies below the acceptable temperature range and the vacuum can be produced to prevent any cooling of the battery. Or the actual temperature is high in such a manner that it lies above the acceptable temperature range, wherein however the generated vacuum is maintained. In particular, such a step is advantageous when a vehicle is parked, since a starting of the vehicle after parking can take place almost or absolutely without equalizing the actual temperature to the desired temperature. This step can be executed in parking situations on very hot days or very cold days.

If a controller of the insulating system for the battery system receives navigation data and/or data from a weather forecast, an advantageous estimate of the intrinsic heating of the battery and the external heat input is possible. In this further development, the vacuum can be controlled according to traffic data, distance data, predicted travel time and day and night temperatures. For example, in cold weather in view of the data, the generation and/or removal or reduction of the vacuum can be controlled so that the battery is operated at somewhat higher temperatures in the range of the desired temperature so that a cold input from outside can be counteracted. This results in an increase in the efficiency of the battery. The navigation data can be obtained by a GPS signal and in conjunction with a navigation system. The weather forecast data can be transmitted by an internet service to the vehicle.

The vacuum in the cavity filled with the porous material is advantageously controlled, wherein a vacuum amount can be continuously controlled from a maximum (such as 10 mbar) as far as a minimum (such as 1 bar) by means of the vacuum pump and the outlet valve, i.e. can be generated, can be reduced and/or can be removed so that the battery/batteries can have a controllable amount of flow around them or not. The liquid cooling can already be provided and be incorporated in the control strategy of the vacuum.

Further advantageous embodiments of the invention are disclosed in the following description of the figures. In the figures:

DETAILED DESCRIPTION

As required, detailed embodiments are disclosed herein; however, it is to be understood that the disclosed embodiments are merely representative of the claimed subject matter that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ one or more embodiments.

In the different figures, the same parts are provided with the same reference numbers and may only be described once.

Figure 1:
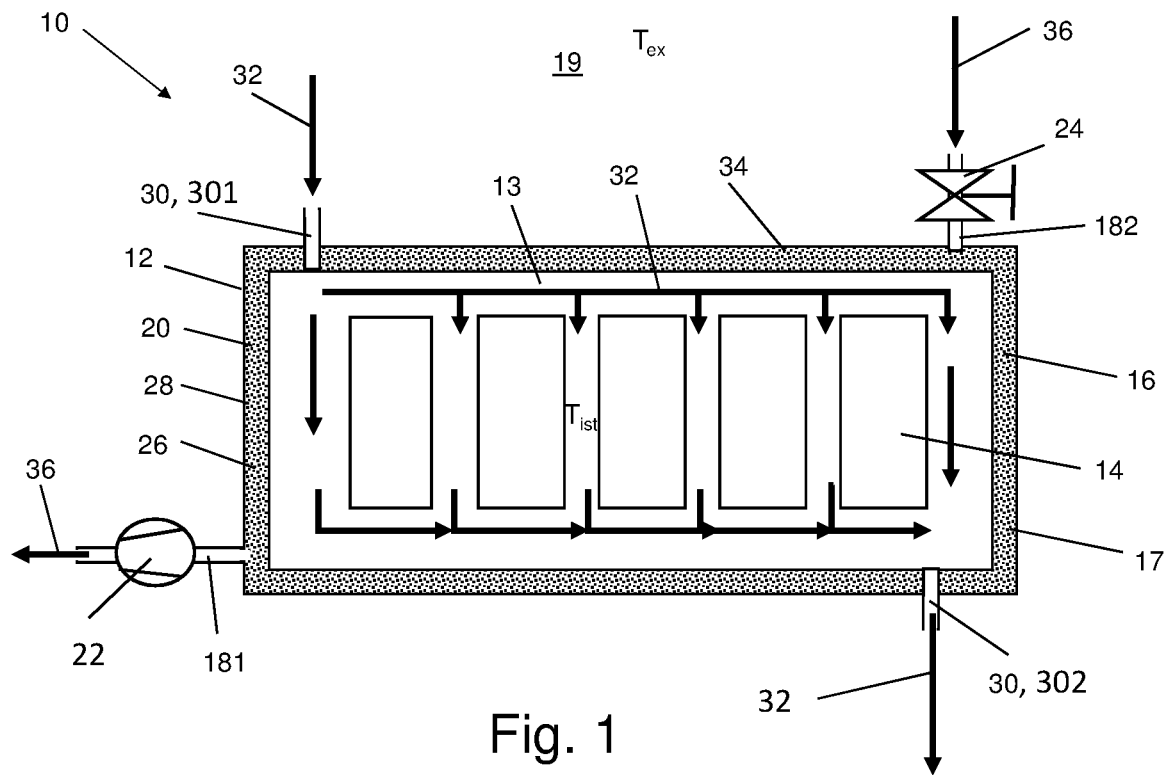
FIG. 1 shows a battery system with an insulating system, which comprises a vacuum pump and an outlet valve.

FIG. 1 shows a battery system 10 of a representative embodiment. Batteries (or battery cells) 14 are arranged at a distance parallel to one another in an interior 13 of a housing 17. Five batteries 14 can be arranged in the housing 17, although the claimed subject matter is generally independent of the number of batteries, which may vary by application and/or implementation. Also, merely one battery 14 can be provided. The batteries 14 are surrounded by an insulating system 12. The battery system 10 therefore comprises an insulating system 12.

The insulating system 12 surrounds the batteries 14 in the depicted embodiment viewed in cross-section on at least four sides, so that the batteries 14 are completely encased by the insulating system 12. Arranged on each side is an insulating plate 16, which comprises an airtight sleeve 34, the cavity 20 of which is filled with a porous material 26 which has pores 28. Preferably microporous silica can be used as porous material 26. The insulating plates 16 can be inserted separately into the housing 17. Alternatively, a circumferential pocket, into which the porous material 26 is poured, can be formed in the housing 17. The walls of the pocket then form the sleeve 34 with the cavity 20 to be filled. The pocket is airtight in one embodiment. The filled pocket thus forms the insulating plate 16. Alternatively, a plurality of pockets can be formed in the housing 17, which are each filled with the porous material 26.

The batteries 14 can be thermally decoupled from an environment 19 by the insulating system 12. Furthermore, an emission of any waste heat of the batteries 14 into the environment 19 can be regulated by the insulating system 12. The insulating system 12 regulates an actual temperature Tist of the batteries 14 in the interior 13 of the housing 17 depending on an ambient temperature Tex, approximately to a range around a desired temperature Tsoll. The desired temperature Tsoll is in this case the operating temperature of the batteries 14, at which the batteries have the best performance, wherein the operating temperature is approximately 30° C.

The insulating plate 16 has a first connection 181 and a second connection 182, which are connected to the cavity 20 filled with the porous material 26 inside the insulating plate 16. In this case, the first and the second connection 181, 182 each only penetrate an outer wall of the sleeve 34. A vacuum pump 22 is connected to the first connection 181. With the vacuum pump 22, the cavity 20 and therefore the pores 28 of the porous material 26 are emptied of any gas such as, for example, air and thus a vacuum is produced inside the insulating plate 16. For example, a pressure of 10 mbar is produced inside the insulating plate 16 by the vacuum pump 22, so that the insulating plate 16 has a thermal conductivity of 0.004 W/m·K. An outlet valve 24 is connected to the second connection 182. The outlet valve 24 opens the cavity 20 so that the vacuum located therein can be reduced or removed, by guiding a gas flow 36 into the cavity 20, such as ambient air, for example. At 1 bar, i.e. at a pressure inside the sleeve 34, which corresponds to the ambient pressure, the insulating plate 16 has a higher thermal conductivity of 0.02 W/m·K.

Two feed-throughs 30 for a liquid 32 are formed in the insulating plate 16 surrounding the batteries 14. The feed-throughs 30 extend through the sleeve 34, the outer wall and inner wall thereof penetrating from a side facing the environment 19 to the interior 13.

Through a first feed-through 301, liquid 32 is guided into the interior 13 where it flows around the batteries 14. In this case, the liquid 32 flows through between the spaced-apart batteries 14. After flowing around the batteries 14, the liquid 32 emerges again from a second feed-through 302 opposite the first feed-through 301 from the interior 13. The liquid 32 is guided through a circuit and in particular a liquid pump back to the first feed-through 301 after it has exchanged heat energy with the batteries 14. As a result, a heat exchange between the batteries 14 and the liquid 32 is made possible. It is also feasible that the liquid circuit is used for heating the batteries 14, in particular if the batteries 14 have a very low actual temperature Tist.

One or more embodiments therefore provide a liquid cooling with the vacuum controllable inside the sleeve 34, wherein the sleeve 34, i.e. its cavity 20 is filled with porous material 26.

Figure 2:
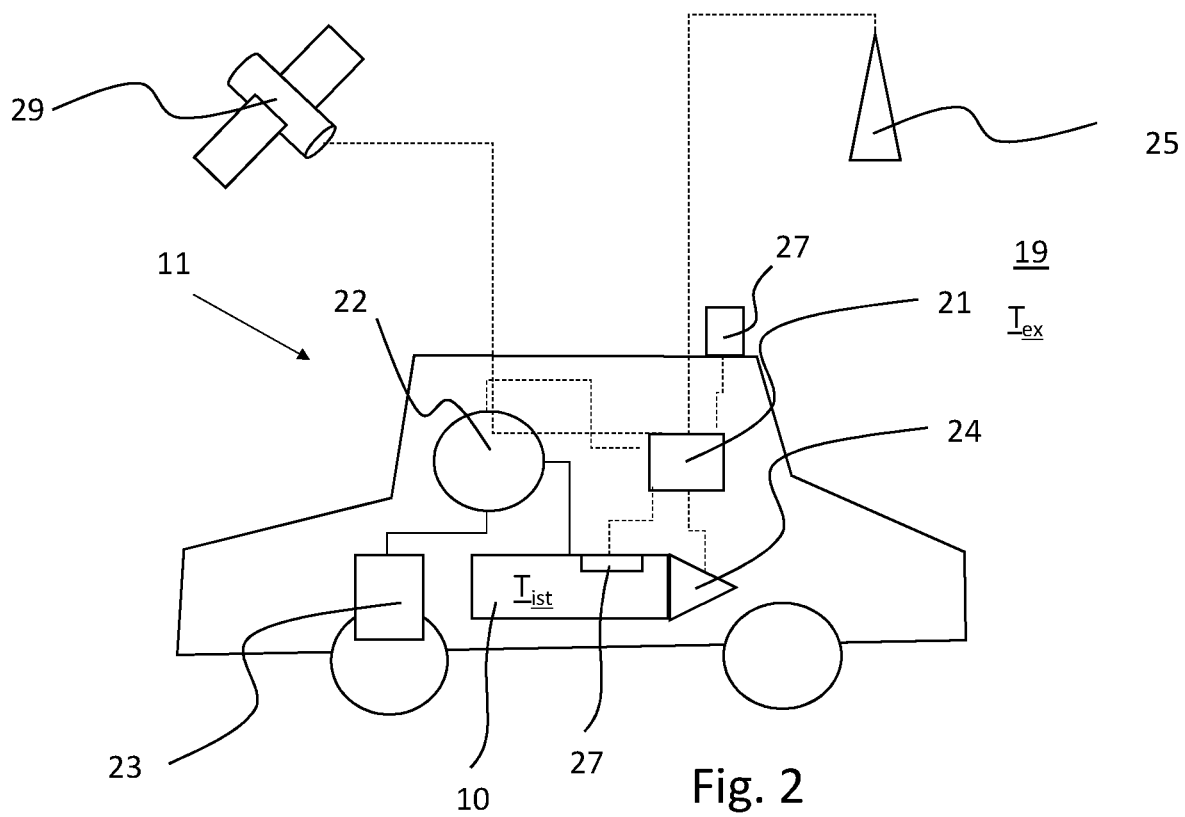
FIG. 2 shows a vehicle with the battery system.

The vacuum pump 22 can in this case be part of another system 23 such as a braking system in a vehicle 11 according to FIG. 2. Likewise the outlet valve 24 can be part of such a system 23. In particular, the environment 19 is outside the vehicle 11, wherein the ambient temperature Tex prevails. The ambient temperature Tex can be measured by a temperature sensor 27. Likewise the actual temperature Tist of the batteries 14 in the battery system 10 can be measured by a temperature sensor 27. The outlet valve 24 and the vacuum pump 22 are controlled by a controller 21. In FIG. 2 the controller 21 is connected to the outlet valve 24 and the vacuum pump 22 by a dashed line, whereas the vacuum lines are shown by a continuous line. Furthermore, the controller 21 can be connected to the internet 25 and/or receive a GPS signal 29, wherein the controller is integrated in a central control device (CPU) of the vehicle or can be designed as a separate control device, which can be connected to the CPU in a wireless or wired manner.

Figure 3:
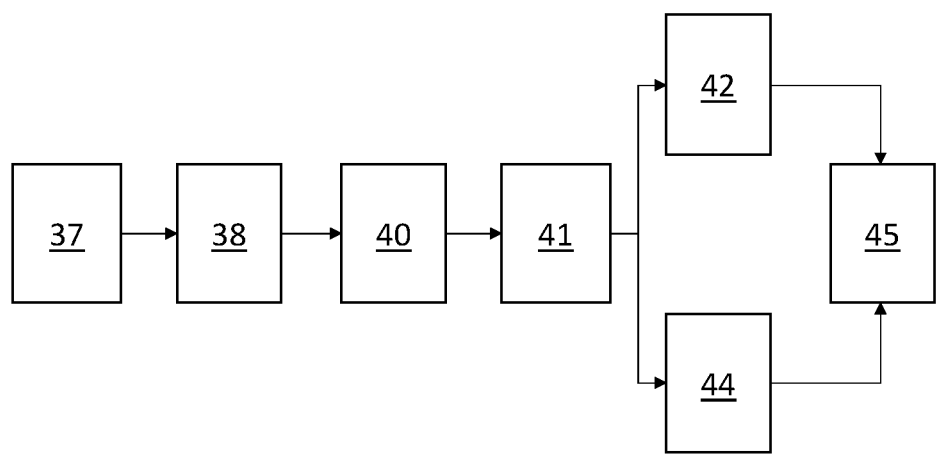
FIG. 3 shows a flow diagram of a method for controlling a battery insulating system.

The flow diagram in FIG. 3 shows a method according to the invention for controlling the insulating system 12. The method is divided into a plurality of steps. In order to determine whether it is necessary to generate a vacuum, firstly the actual temperature Tist of the battery 14 and the ambient temperature Tex must be determined in a measurement 37. The measurement 37 may be made by means of the temperature sensors 27, or provided from a wireless device or estimated, for example.

If the controller 21 determines, by the measurement 37, that a difference between the desired temperature Tsoll and the ambient temperature Tex is greater than or equal to a temperature difference dT stored in the controller 21, the vacuum pump 22 begins to increase vacuum (lower pressure and may generate a maximum vacuum in the cavity 20 of the insulating plates 16. The generation 38 of the vacuum therefore takes place under the condition:

$$Tex-Tsoll \geq dT \text{ where } Tist \text{ is not in range } Tk$$

In particular, the generation 38 of the vacuum takes place under this condition when the actual temperature Tist deviates strongly from the desired temperature Tsoll, the actual temperature Tist lies outside an acceptable temperature range Tk. In the case of a high ambient temperature Tex, the vacuum protects against additional heat input into the batteries 14, so that the batteries 14 are heated by their intrinsic heat approximately to the desired temperature Tsoll, whereby any overheating is prevented. In this case, dT and Tk can coincide.

At an ambient temperature Tex, which is lower than the desired temperature Tsoll, the vacuum protects against the coldness of the environment 19, so that the batteries 14 approximately reach the desired temperature Tsoll as a result of their intrinsic heat in an appropriate time, since any cooling is prevented. The batteries 14 are therefore thermally decoupled from the environment 19. This case occurs when the actual temperature Tist is less than or equal to a difference of the desired temperature Tsoll and half the acceptable temperature Tk. This follows the condition:

$$Tsoll-Tex \geq dT \text{ and } Tist \leq Tsoll-Tk/2$$

A vacuum is therefore not generated when a difference between the desired temperature Tsoll and the ambient temperature Tex is greater than or equal to the difference temperature dT and at the same time the actual temperature Tist is greater than or equal to the sum of the desired temperature Tsoll and half the acceptable temperature Tk. This follows the condition:

$$Tsoll-Tex \geq dT \text{ and } Tist \geq Tsoll+Tk/2$$

If the actual temperature Tist has approximately reached the predefined desired temperature Tsoll, for example, in the range of 30° C., the vacuum is removed and/or reduced from the insulating plates 16. As a result, the thermal conductivity of the insulating plates 16 is increased again until an equilibrium is established between heat input into and heat removal from the batteries 14. This reduction and/or removal 40 of the vacuum is therefore subject to the following mathematical condition, whereby the actual temperature Tist merely needs to enter into a predefined range of the desired temperature Tsoll:

$$Tist \approx Tsoll$$

In a parking situation of the vehicle 11, the steps can be divided into two different cases. To this end, an examination 41 of the ambient temperature Tex and the actual temperature Tist is made.

If the examination 41 comes to the conclusion that the vehicle 11 has been parked at an ambient temperature Tex, which is lower than or equal to the actual temperature Tist of the battery 14, then in the first case a reduction and/or removal of the vacuum 42 takes place. However, the ambient temperature Tex must lie around the desired temperature Tsoll in the predefined acceptable temperature range Tk. In other words, the ambient temperature Tex must not deviate too substantially from the desired temperature Tsoll. The step 42 is based on the condition $$Tex \leq Tist \text{ where } Tex \text{ is in } Tk.$$

This condition is achieved, for example, on summer nights or with mild daytime temperatures.

In a second case in which after a journey with the vehicle 11, the actual temperature Tist is approximately equal to the desired temperature Tsoll, i.e. Tist Tsoll, and the ambient temperature Tex is either higher or lower than the actual temperature Tist, it is determined that the ambient temperature Tex does not lie in the acceptable temperature range Tk. In order to avoid too strong cooling or heating by a thermal coupling with the environment 19, the step of generating 44 a vacuum in the parking situation is initiated under these conditions $Tex < Tist$ or $Tex > Tist$ where $Tex$ is not in $Tk$.

The vacuum generation may be initiated shortly before parking the vehicle 11.

In both cases of steps 42,44, the actual temperature Tist is approximately maintained at the desired temperature Tsoll at least for a specific period of time during parking. The maintaining 45 of the actual temperature Tist makes it possible to start up the battery 14 or the vehicle 11 in this ensured period of time with a high efficiency.

The controller 21 of the insulating system 12 for the battery system 10 can receive and evaluate navigation data, for example, via a GPS signal 29 and/or data from a weather forecast, for example via the internet 25, as shown in FIG. 2. An estimate of the increase in the actual temperature Tist of the battery in 14 connection with the ambient temperature Tex is thereby made. In this case, the vacuum is controlled according to traffic data, distance data, predicted journey times, and daytime and nighttime temperatures, For example, in cold weather the generation and removal or reduction of the vacuum is controlled by the data so that the actual temperature Tist of the battery 14 is set at temperatures above the desired temperature Tsoll but in the range around the desired temperature Tsoll so than an input of cold from outside is counteracted.

While representative embodiments are described above, it is not intended that these embodiments describe all possible forms of the claimed subject matter. The words used in the specification are words of description rather than limitation, and it is understood that various changes may be made without departing from the spirit and scope of the disclosure. Additionally, the features of various implementing embodiments may be combined to form further embodiments that may not be explicitly illustrated or described.

What is claimed is:

1. A vehicle battery system, comprising:
    a housing configured to receive a plurality of battery cells, the housing having an insulating system including an inner wall and an outer wall forming an insulating cavity containing a microporous material, the insulating cavity fluidly coupled to first and second connections, the housing including a fluid inlet port and a fluid outlet port extending through the insulating cavity and configured to deliver a heat exchanging fluid to the plurality of battery cells;
    a vacuum pump coupled to the first connection of the insulating cavity;
    a valve coupled to the second connection of the insulating cavity; and
    a controller coupled to the vacuum pump and the valve, the controller configured to control operation of the valve and the vacuum pump to change thermal conductivity of the insulating cavity in response to temperature of the plurality of battery cells.

2. The vehicle battery system of claim 1 further comprising a pump coupled to the fluid inlet port and the fluid outlet port and configured to circulate the heat exchanging fluid.

3. The vehicle battery system of claim 1 wherein the controller is configured to operate the vacuum pump to reduce pressure within the insulating cavity in response to a difference between a current temperature of the plurality of battery cells and a desired temperature of the plurality of battery cells.

4. The vehicle battery system of claim 1 wherein the insulating system encompasses the plurality of battery cells.

5. The vehicle battery system of claim 1 wherein the housing comprises at least one pocket configured to receive the insulating system.

6. The vehicle battery system of claim 1 wherein the microporous material comprises microporous silica.

7. The vehicle battery system of claim 1 wherein the controller is further configured to receive ambient temperature information, and to control the vacuum pump and the valve in response to the ambient temperature information.

8. The vehicle battery system of claim 7 wherein the controller wirelessly receives the ambient temperature information.

9. The vehicle battery system of claim 8 wherein the controller is configured to detect a vehicle parking event in response to vehicle speed being below a threshold.

10. A vehicle comprising:
    a traction battery having a plurality of battery cells disposed within a housing;
    a battery insulation system disposed between the plurality of battery cells and the housing and including inner and outer walls defining a cavity containing microporous silica;
    a vacuum pump coupled to a first port of the cavity;
    a valve coupled to a second port of the cavity;
    a coolant pump coupled to inlet and outlet ports of the housing, the inlet and outlet ports extending through the cavity to route heat exchanging fluid around the plurality of battery cells; and
    a controller communicating with the vacuum pump and the valve, the controller programmed to control the vacuum pump and the valve to lower pressure within the cavity responsive to a temperature difference between ambient temperature and temperature of the traction battery exceeding a threshold to decrease thermal conductivity of the insulation system, and to control the valve to increase pressure within the cavity responsive to the temperature difference not exceeding the threshold.

11. The vehicle of claim 10 wherein the controller is configured to control the vacuum pump and the valve in response to detecting a vehicle parking event.

12. The vehicle of claim 11 wherein the controller detects a parking event based on vehicle steering and vehicle speed.

13. The vehicle of claim 11 wherein the controller wirelessly receives ambient temperature information.

* * * * *